(12) United States Patent
Schub et al.

(10) Patent No.: US 11,334,549 B2
(45) Date of Patent: May 17, 2022

(54) SEMANTIC, SINGLE-COLUMN IDENTIFIERS FOR DATA ENTRIES

(71) Applicant: SAP SE, Walldorf (DE)

(72) Inventors: Stephan Schub, Oftersheim (DE); Jan Portisch, Bruchsal (DE); Michael Monych, Mannheim (DE)

(73) Assignee: SAP SE, Walldorf (DE)

( * ) Notice: Subject to any disclaimer, the term of this patent is extended or adjusted under 35 U.S.C. 154(b) by 240 days.

(21) Appl. No.: 16/564,365

(22) Filed: Sep. 9, 2019

(65) Prior Publication Data

US 2021/0073196 A1 Mar. 11, 2021

(51) Int. Cl.
*G06F 16/00* (2019.01)
*G06F 16/22* (2019.01)
*G06F 16/21* (2019.01)

(52) U.S. Cl.
CPC ........ *G06F 16/2282* (2019.01); *G06F 16/212* (2019.01); *G06F 16/221* (2019.01)

(58) Field of Classification Search
CPC .. G96F 16/212; G06F 16/221; G06F 16/2282; G06F 16/2291
See application file for complete search history.

(56) References Cited

U.S. PATENT DOCUMENTS

| | | | |
|---|---|---|---|
| 7,934,207 B2 | 4/2011 | Gustafsson et al. | |
| 8,370,233 B2 | 2/2013 | Kaisermayr et al. | |
| 8,788,931 B1 | 7/2014 | Chen et al. | |
| 2007/0005630 A1* | 1/2007 | Selca | G06F 16/217 |
| 2008/0140689 A1* | 6/2008 | Chen | G06F 16/2379 |
| 2009/0248586 A1 | 10/2009 | Kaisermayr et al. | |
| 2010/0070500 A1 | 3/2010 | Cui et al. | |
| 2012/0166459 A1 | 6/2012 | Ritter et al. | |
| 2013/0111381 A1 | 5/2013 | Ritter et al. | |
| 2013/0138597 A1 | 5/2013 | Kyle | |
| 2013/0166495 A1 | 6/2013 | Kazmaier et al. | |
| 2013/0179772 A1 | 6/2013 | Nakamura | |
| 2016/0321307 A1 | 11/2016 | Digman et al. | |
| 2016/0357787 A1 | 12/2016 | Kolata et al. | |
| 2016/0371117 A1 | 12/2016 | Mishra et al. | |
| 2018/0081938 A1 | 3/2018 | Khuong et al. | |
| 2019/0034482 A1 | 1/2019 | Werner et al. | |
| 2019/0303207 A1 | 10/2019 | Vadapandeshwara et al. | |

(Continued)

OTHER PUBLICATIONS

Fan et al., "Transformation of Relational Database Schema to Semantics Web Model," 2010 Second International Conference on Communication Systems, Networks and Applications, pp. 379-384. (Year: 2010).*

(Continued)

*Primary Examiner* — Cheryl Lewis
(74) *Attorney, Agent, or Firm* — Klarquist Sparkman, LLP

(57) ABSTRACT

Techniques and solutions are described for identifying data, such as records in a relational database. The data can have a first plurality of attributes, a second plurality of which are used to create the identifier. The identifier can be included as a column in a data structure in which the data is stored, such as a column in a table storing a record. The disclosed data identifiers can provide semantically meaningful information. The disclosed identifiers can also improve data store performance, such as by facilitating data retrieval, and helping to guard against inserting duplicate entries in the data store.

20 Claims, 11 Drawing Sheets

(56) References Cited

U.S. PATENT DOCUMENTS

| | | |
|---|---|---|
| 2019/0384836 A1 | 12/2019 | Roth et al. |
| 2020/0250260 A1 | 8/2020 | Portisch et al. |
| 2020/0349130 A1 | 11/2020 | Bracholdt et al. |
| 2021/0012219 A1 | 1/2021 | Portisch et al. |
| 2021/0073655 A1 | 3/2021 | Portisch et al. |
| 2021/0357577 A1 | 11/2021 | Portisch et al. |

OTHER PUBLICATIONS

"Binary tree," Wikipedia, available at: https://en.wikipedia.org/wiki/Binary_tree, 7 pages, page last updated Jul. 2, 2019, retrieved on Aug. 20, 2019.

"Probability Tree Diagrams," https://www.mathsisfun.com/data/probability-tree-diagrams.html, retrieved on or more Sep. 9, 2019, 5 pp.

"Scratch (programming language)," Wikipedia, visited Jan. 31, 2019, 13 pages.

Blumöhr et al., "Variant Configuration with SAP," retrieved from https://www.sap-press.com/variant-configuration-with-sap_2889/, on or before Jan. 2018, 52 pp.

Gulwani, S. et al., "Program Analysis as Constraint Solving," retrieved from https://www.microsoft.com/en-us/research/wp-content/uploads/2016/12/pldi08_cs.pdf on or before Jan. 2018, 12 pp.

Hauptmann, "Introduction to Variant Configuration with an example model," retrieved from https://wiki.scn.sap.com/wiki/display/PLM/Introduction+to+Variant+Configuration+with+an+example+model on or before Jan. 2018, 11 pp.

Kumbum, R., "Variant Configuration," retrieved from https://www.slideshare.net/KUMBUM/sap-variant-configuration-34736665 on or before Jan. 2018, 84 pp.

Lecoutre, C. et al., "Improving the lower bound of simple tabular reduction," retrieved from https://link.springer.com/article/10.1007/s10601-014-9171-9 on or before Jan. 2018, 9 pp.

Lecoutre, C., "STR2: optimized simple tabular reduction for table constraints," retrieved from https://link.springer.com/article/10.1007/s10601-011-9107-6 on or before Jan. 2018, 31 pp.

Li, H. et al., "Making Simple Tabular Reduction Works on Negative Table Constraints," retrieved from https://pdfs.semanticscholar.org/8057/f234d2f1b3591cffeb8d651e15e1043fd78d.pdf on or before Jan. 2018, 2 pp.

Marriott, K. et al., "Negative Boolean constraints," retrieved from https://www.sciencedirect.com/science/article/pii/030439759500209X on or before Jan. 2018, 16 pp.

Ullmann, J., "Partition search for non-binary constraint satisfaction," retrieved from http://cse.unl.edu/~choueiry/Documents/Ullmann2007-GAC.pdf on or before Jan. 2018, 40 pp.

Wallace, M., "Practical Applications of Constraint Programming," retrieved from https://link.springer.com/article/10.1007/BF00143881 on or before Jan. 2018, 30 pp.

Office Action received in related U.S. Appl. No. 16/265,063, dated Nov. 5, 2020, 25 pages.

Notice of Allowance received in U.S. Appl. No. 16/265,063, dated May 3, 2021, 9 pages.

\* cited by examiner

Entity          /—412                             410

$OID_D$: <company><software_component> = sap-mapping_tool
$SE_D$ : <type> = 'entity' —414
$SID_D$: <schema_code><schema_version_code><entity_code>
        416
Exemplary URN: urn:sap-mapping_tool:entity:fsdm-v2-loan
       418

Attribute        /—422                        420

$OID_D$: <company><software_component> = sap-mapping_tool
$SE_D$ : <type> = 'attribute'—424
$SID_D$: <schema_code><schema_version_code><entitiy_name><attribute_code>
      426
Exemplary URN: urn:sap-mapping_tool:attribute:fsdm-v2-loan-currency
      428

Inheritance      /—432                       430

$OID_D$: <company><software_component> = sap-mapping_tool
$SE_D$: <type> = 'inheritance'—434
$SID_D$: <schema_code><schema_version_code><inheritance_code><parent_entity_code>
     436
Exemplary URN: urn:sap-mapping_tool:inheritance:fsdm-v2-retail_loan-loan
     438

Relationship     /—442                       440

$OID_D$: <company><software_component> = sap-mapping_tool
$SE_D$: <type> = 'relationship'— 444   /—446
$SID_D$: <schema_code><schema_version_code><relationship_code><entity_A_code><entity_B_code>
Exemplary URN: urn:sap-mapping_tool:relationship:fsdm-v2-loan_customer-loan-customer
     448

FIG. 4

| DataSchema | ObjectID | Name | Description | ObjectType | ValueList | Comment | IsVirtual | Schema_Version_Code | Entity_Name | Entity_Code | Attribute_Code |
|---|---|---|---|---|---|---|---|---|---|---|---|
| fsdm | 76213 | Materials | Materials | ENTITY | NULL | NULL | FALSE | v2 | Materials | Materials | NULL |
| fsdm | 09862 | Currency | Currency | ATTRIBUTE | NULL | NULL | FALSE | v2 | NULL | NULL | Currency |
| fsdm | 87120 | retail_loan | retail_loan | INHERITANCE | NULL | NULL | FALSE | v2 | NULL | NULL | NULL |
| fsdm | 00982 | loan_customer | loan_customer | RELATIONSHIP | NULL | | | | | | |

| Inheritance_Code | Parent_Entity_Code | Relationship_Code | Entity_A_Code | Entity_B_Code |
|---|---|---|---|---|
| NULL | NULL | NULL | NULL | NULL |
| retain_loan | loan | NULL | NULL | NULL |
| NULL | NULL | loan_customer | loan | customer |

FIG. 5

```
SELECT TN.SCHEMA_NODE_CODE AS TARGET_NODE, TN.SCHEMA_NODE_NAME AS TARGET_NODE_NAME, TN.DESCRIPTION AS
TARGET_NODE_DESCRIPTION, SN.SCHEMA_NODE_CODE AS SOURCE_NODE, SN.SCHEMA_NODE_NAME AS SOURCE_NODE_NAME,
SN.DESCRIPTION AS SOURCE_NODE_DESCRIPTION

FROM CORRESPONDENCE AS COR  ─── 650

INNER JOIN SCHEMA_NODE AS TN
ON COR.TARGET_NODE_URN = TN.URN

INNER JOIN CORRESPONDENCE_NODE AS VN  ─── 658
ON VN.CORRESPONDENCE_URN = COR.CORRESPONDENCE_URN

INNER JOIN SCHEMA_NODE AS SN
ON VN.INPUT_NODE_URN = SN.URN  ─── 666

ORDER BY TARGET_NODE
```

SEMANTIC, SINGLE-COLUMN IDENTIFIERS FOR DATA ENTRIES

FIELD

The present disclosure generally relates to identifiers for entries in a data store, such as for records in a database system. Particular embodiments relate to semantically-meaningful single-value identifiers.

BACKGROUND

Being able to locate unique records in a database is a key consideration in database design. Indeed, a significant amount of the utility of database systems may be lost if records cannot be uniquely identified. Typically, primary keys are constructed from one or more attributes in a database table. In some cases, artificial identifiers can be assigned to rows in a database table and used as unique row identifiers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for identifying data, such as records in a relational database. The data can have a first plurality of attributes, a second plurality of which are used to create the identifier. The identifier can be included as a column in a data structure in which the data is stored, such as a column in a table storing a record. The disclosed data identifiers can provide semantically meaningful information. The disclosed identifiers can also improve data store performance, such as by facilitating data retrieval, and helping to guard against inserting duplicate entries in the data store.

In one aspect, a method is provided of generating a row identifier for data to be inserted into a database table, such as a relational database table or a table in the form of a key-value store. Data is obtained that is to be inserted into a database table. The database table includes a first plurality of fields (e.g., attributes). The data to be inserted has values for a second plurality of fields of the first plurality of fields. In some cases, the second plurality of fields can be the same as the first plurality of fields.

A row identifier is generated for the data. The row identifier has values from a third plurality of fields of the second plurality of fields. In some cases, the third plurality of fields can be the same as the second plurality of fields.

The data is populated into the database table. The populating includes populating a row identifier field of the first plurality of fields with the row identifier.

In another aspect, a method is provided for generating an identifier for data to be stored in a data store, such as a database system (e.g., a relational database system) or a key-value store. Data is obtained to be inserted into a data store. The data store has at least a first column (which can be, for example, a key column of a key-value store) and at least a second column (which can be, for example, a value column of a key-value store). The data is structured, and has values for a first plurality of value types. For example, the data can be an instance of an abstract or composite data type, where the data values correspond to data members, and the instance has values for at least some of the data members.

An identifier for the data is generated. The identifier includes values for a second plurality of fields of the first plurality of fields. The identifier also includes a namespace identifier for the data store (such as an identifier of a database system or a schema of the database system).

The data is populated to the data store. The populating includes populating the first column of the data store with the generated identifier.

In a further aspect, a method is provided for generating a row identifier for data associated with a database table, such as data stored in the database table, data to be inserted into the database table, or data to be compared with data in the database table. Data associated with the database table is obtained. The database table includes a first plurality of fields (e.g., columns or attributes). The data includes values for a second plurality of fields of the first plurality of fields. In some cases, the second plurality of fields can be the same as the first plurality of fields.

A row identifier for the data is generated. The row identifier includes values for a third plurality of fields of the second plurality of fields. In some cases, the third plurality of fields can be the same as the second plurality of fields.

A row identifier field of the first plurality of fields is populated with the row identifier.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 4 illustrates how attributes of the data model of FIG. 3 can be used to generate data identifiers for different types of data objects in a denormalized database table.

FIG. 5 is an example database table according to the data model of FIG. 3.

FIG. 7 illustrates example SQL code for retrieving information from tables of the data model of FIG. 6, using JOIN operations, including JOIN operations on single columns having disclosed data identifiers.

FIG. 8 is a table illustrating example query results from using the SQL code of FIG. 7.

DETAILED DESCRIPTION

Example 1

Overview

Figure 1:
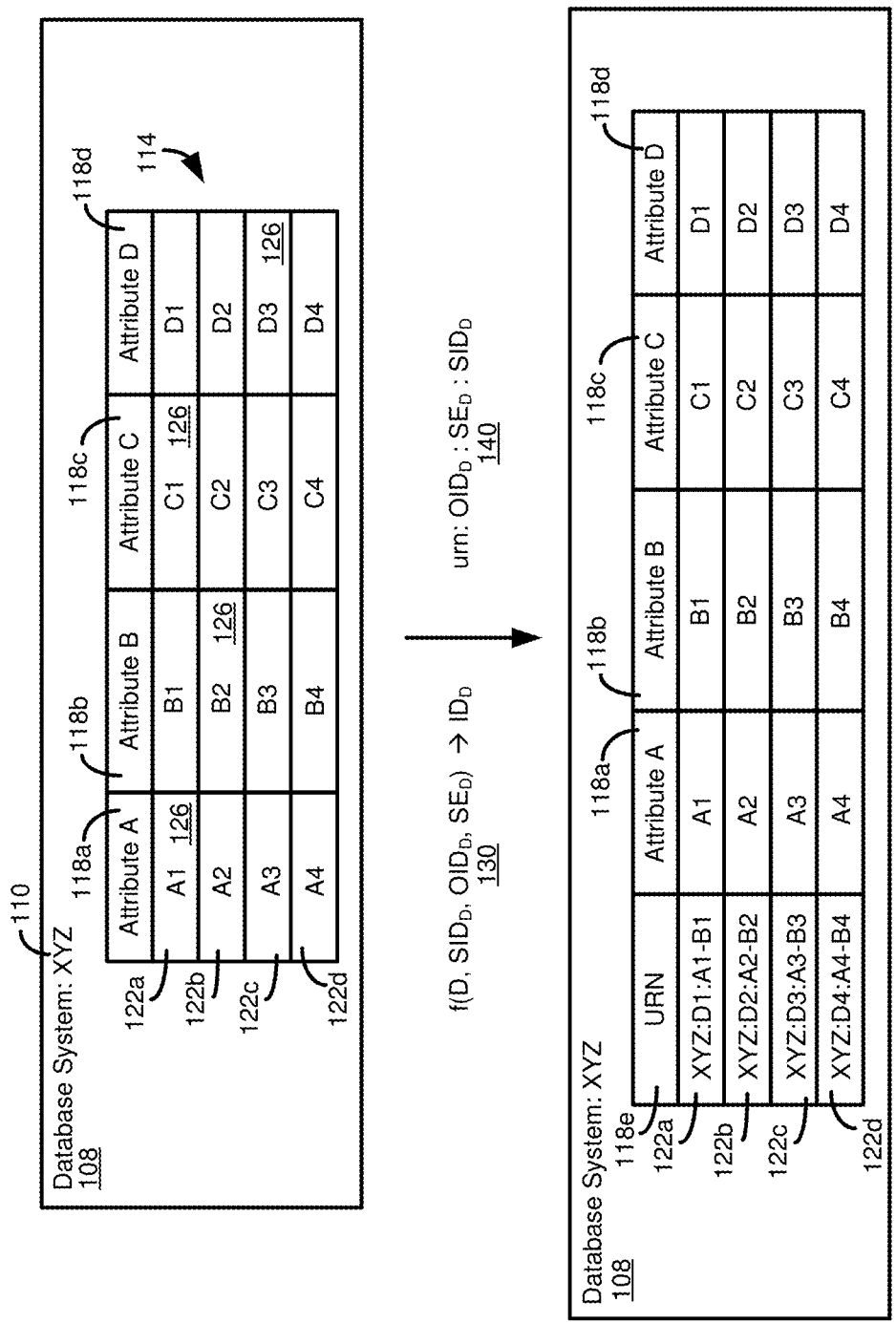
FIG. 1 is a diagram illustrating how attributes of a generalized database table can be used to generate unique record identifiers.

Being able to locate unique records in a database is a key consideration in database design. Indeed, a significant amount of the utility of database systems may be lost if records cannot be uniquely identified. Typically, primary keys are constructed from one or more attributes in a database table. In some cases, artificial identifiers can be assigned to rows in a database table and used as unique row identifiers. These prior approaches can suffer from various disadvantages. Accordingly, room for improvement exists in the assignment of unique identifiers for database tables.

As described above, commonly, one or more attributes in a table can uniquely identify a particular record (i.e., a particular row) in the table. Row identifiers can generally be referred to as "keys." Super keys can refer to one attribute, or a combination of multiple attributes, that are capable of uniquely identifying a database record. In some cases, there can be multiple super keys for a table. Some super keys may be subsets of other super keys. That is, for example, if attributes A and B serve as a super key, then adding attribute C, attribute D, etc. to that combination results in combinations that are also super keys—since they contain A and B, which by themselves are sufficient to uniquely identify table rows.

Candidate keys can refer to super keys that have the smallest number of attributes needed to uniquely identify a table row. In the above example, while {A, B, C} and {A, B} are both super keys, only {A, B} would be designated as a candidate key. A primary key is a candidate key chosen, typically by the designer of a database schema, to actually serve as the unique identifier for the database table. A primary key can be chosen, in some cases, based on the expected use of the attributes in the candidate key. For example, database indexes are typically created based on a primary key. In some cases, the index itself can be used to answer queries, and so thoughtful selection of primary keys can speed queries by allowing them to be answered using the index, rather than having to access the actual table.

One problem that can arise in the use of primary keys based on table attributes is that multiple columns need to be used to refer to a particular row. Scanning a table for rows meeting particular criteria can thus be computationally expensive, which can be particularly expensive in operations such as table joins.

Artificial primary keys can be assigned to table records, such as when a particular record is inserted into the table. The key values are unique, and in at least some cases can be randomly generated. In other cases, an identifier value can be incremented, where a current value is assigned to a newly created row, and then the current value is incremented. Typically, an attribute corresponding to the row identifier is added to the table to hold the row identifier. Because the artificial identifier is not based on actual record data (e.g., a record representing an entity for an entity class defined by the table schema), artificial identifiers can be referred to as surrogate keys.

Unique, artificial identifiers can help address at least certain problems associated with composite primary keys (i.e., primary keys that include a plurality of attributes). For example, rows that could normally only be accessed using multiple columns associated with a composite primary key can instead be accessed using a single column surrogate key.

The use of surrogate keys, however, can also have drawbacks. Surrogate keys typically fail to provide sematic information regarding the data in the corresponding row, or even about the table in which the row appears. Take, for example, a table that might represent a car registration, having a structure and row as indicated below:

| Surrogate Key | Make | Model | Color | Year | Owner ID |
|---|---|---|---|---|---|
| 1CE4B | VW | Golf | Green | 2016 | 763123 |

Consider two versions of the table above, one with the surrogate key and one without. For the version without the surrogate key, assume that {Make, Model, Color, Year, Owner} is the primary key, and the only possible primary key (e.g., because an owner may own multiple cars, including cars having the same make and the same model, but where the owner will not have two cars having the same make, model, color, and year, and because, for any given make/model/color/year, multiple cars may exist, but with different owners). In this case, without considering the use of an index, all columns of the table are required to be accessed in order to locate a single record.

In the example table, the primary key value of the single record in the table is {VW, Golf, Green, 2016, 763123}. Assume that a developer or database administrator is troubleshooting, and the record in the table is associated with an error. The primary key above provides meaningful information, and may assist the developer in identifying the source of the problem and correcting it. For example, it could be that green VW Golfs were not available for sale in 2016. Or, the developer may look for problems with a particular Owner ID value. On the other hand, while the surrogate key 1CE4B may be used to concisely access the record, it may not provide any sematic information about the record to the developer or database administrator.

The present disclosure provides technologies that can provide both the benefits of surrogate keys and the benefits of semantically-rich primary keys, while reducing or eliminating their corresponding drawbacks. In a particular implementation, the present disclosure provides a unique identifier in the form of a uniform resource name (URN) useable to uniquely identify records in a particular table. The URN can include attributes forming a super key for the table, including a candidate key, such as a key that might be selected as a primary key in the absence of the URN. Unless the context clearly indicates otherwise, when URNs are discussed in the remainder of this disclosure, it should be understood that the discussion applies to disclosed data identifiers that can be implemented other than as URNs, or as URNs having a different format, syntax, etc. than example URNs that are provided.

In a further embodiment, the URN can include additional information to help provide a URN that provides meaningful semantic information, and serves the purpose of uniquely identifying a table row. For example, the URN can include attributes of the table that may not be in a primary key, or even serve as part of a composite super key (including a candidate key), but which may be meaningful to an end user. In at least some cases, the semantically enriching information can be selected by a user when a URN definition is specified for a particular table schema (or a schema for other database objects, such as views).

The URN can include information that further serves to uniquely identify particular table records, and may provide information about the source of a table record. In particular, the URN can include a namespace identifier. The namespace identifier can represent a particular database system or a particular sub-set of a particular database system. For example, assume that an entity has two geographically separated offices that use at least part of a common table schema. The URN can include a namespace identifier that serves to identify the geographic location of the office, such that records of a first location can be distinguished from records of the second location, even if the records otherwise have identical information in the URN for a given table.

When the namespace identifier represents a sub-set of a particular database system, the namespace identifier can refer to a particular organization or other entity associated with the database system. In a cloud environment, for example, a namespace identifier can refer to a particular tenant of a multi-tenant database system. Or, a database system (including a particular tenant container) can include records that have multiple different sources, including organizations or other entities, and the namespace indicator can be used to indicate the record source.

The URN can be added to rows in the table, such as by adding to the table an attribute corresponding to the URN, or adding the URN to row metadata. Providing the URN as an attribute, or in a format that provides equivalent functionality, can allow records to be uniquely identified based on a single, semantically-meaningful column value.

The disclosed technologies can provide various advantages. The use of a semantically meaningful, single-value primary key can assist in development and debugging efforts, as developers may be presented with meaningful information about a particular entity (record) that may be associated with a bug or error message.

Because a particular record can be identified based on a single column, database operations, such as selects and joins, can be carried out more quickly, and with greater computational efficiency (e.g., less memory or processor use).

The disclosed data identifiers (including as URNs) can more accurately associate entities with particular identifiers, compared with surrogate keys or similar artificial identifiers. For example, if two systems use different surrogate keys, it can be difficult to determine when duplicate records are being added to a table, such as when transactional data is loaded into an analytical database system (e.g., as part of an ETL or ELT process). As the disclosed URNs are based on actual attributes of a particular entity, the likelihood is greater than the same entity would be assigned the same key value/URN, allowing duplicate entries to be detected.

Although in some cases the use of a namespace identifier can be optional, and omitted, for a URN, in many cases it can be beneficial to include a namespace identifier to help avoid collisions between database entries. For example, if a "material" table includes materials associated with a variety of departments in an organization, it is possible that two departments might have identical records for a material. When the records are combined into the material table, a collision could occur. Including a namespace identifier in the URN for the material table can help ensure that collisions do not occur between records from the different departments. At the same time, the namespace identifier can be used to help ensure that records that should be treated as identical are in fact recognized as such. For instance, if multiple sources for a "finishing" department material table exist, the namespace identifier can be used to determine when records for the different sources represent the same entity.

Typically, database tables are normalized—where data that might possibly be stored in a single table is split into multiple tables according to particular rules. Database normalization can be used to reduce data redundancy and improve data integrity. For example, many databases are normalized into the BCNF form. However, database normalization may yield particular benefits for row-oriented database systems, where performance can be enhanced in column-oriented database systems by denormalizing database tables. However, if the database objects in the denormalized table are sufficiently different, it may be difficult to construct a primary key that is semantically meaningful, and so surrogate keys are often used instead.

The disclosed URNs can provide a way of uniquely identifying records in a denormalized table, while still providing a row identifier that provides semantic meaning. In some cases, multiple URNs can be used for a single table, where a given URN uses a different combination of attributes useable to identify a particular entity type in a table with multiple entity types, and optionally semantically enriching information about an entity type.

Although described with respect to relational databases, the disclosed data identifiers can provide benefits in other data storage contexts. For example, key-value stores are typically required to have a single key. In situations where a particular object is identified by a particular combination of multiple properties, artificial keys are often used. These artificial keys are similar to the surrogate keys described above, and can suffer from the same drawbacks—having an identifier (key) for a particular value in the data store that does not provide meaningful information about the object represented by that key.

In some cases, use of the disclosed URNs can reduce or eliminate the need for external indices, which can speed database operations, as well as reducing storage/memory requirements and potentially making the database system easier to maintain. In particular, column-store databases may be configured to use columns in a similar manner as indices, and having a column that includes relevant information from multiple columns can further improve database operations and maintenance, including potentially satisfying a query from a URN column, rather than using an external index or having to scan multiple columns of a table. A URN column may also be able to take advantage of compression techniques used for columns in a column-store database, which can further reduce memory/storage requirements and expedite data retrieval.

Example 2

Example Generalized Method for Creating Data Identifiers

FIG. 1 provides a generalized example of how a URN can be defined for a particular table, having a particular schema, and how the schema can be modified to incorporate the URN. A database system 108 can be associated with a particular identifier 110, "XYZ" as shown. A table 114 of the database system 108 is shown as having attributes 118 (118a-118d), and includes four rows, or records, 122 (122a-122d). Each attribute 118 for each record 122 is associated with a value 126. However, in some cases, a given value 126 can be a blank value (e.g., no value is assigned to that cell), or can be a NULL value. In some cases, logic for generating a URN can be programmed to omit NULL values from a URN.

Function 130 illustrates how a unique identifier, $ID_D$, can be determined for a given row D. According to the function 130, $ID_D$ is determined by the row 122 of the table (in particular, values 126 for the row) as:

$$f(D, SID_D, OID_D, SE_D) \to ID_D$$

where:

D is the row 122 of the table 114;

$SID_D$ represents the semantic information needed to uniquely identify an entity in the table 114, where the individual components of the semantic information are $sid_{iD} \in SID_D$ where $|i|=|SID_D|$;

$OID_D$ represents the namespace of the database, or owner of the data record, where the individual components of the namespace are $oid_{iD} \in OID_D$ where $|i|=|OID_D|$;

$SE_D$ represents semantically enriching information about D, which semantic information is not required to uniquely identify D;

$ID_D$ is a unique identifier for D that can be stored in a single column of the table 114, where the individual components are $id_{iD} \in ID_D$ where $|i|=|ID_D|$, where $OID_D \subset ID_D$ and $SID_D \subset ID_D$;

such that: D, $SID_D$, $OID_D \notin \{\ \}$; and such that: $SE_D$ is optional, $SE_D \subset ID_D$, and can be null.

$ID_D$ can be used to generate a URN 140, where the URN may have a particular syntax. That is, the $ID_D$ can define elements that can be used as data identifiers, and URNs can provide a particular syntax for expressing an $ID_D$.

As shown, the syntax of the URN is $OID_D$, $SE_D$ (if present) and $SID_D$ separated by colons. However, it should be appreciated that the disclosed technologies are not necessarily limited to any particular syntax. Also, although the $OID_D$ is included in the URN definition, in other cases, a URN, or more generally, a data identifier, need not include an $OID_D$.

The rules for generating URNs typically will be set on a table-by-table basis. However, in some cases, default URN formats can be specified. For example, if a database system is being converted to a URN-based key format, and currently has a primary key based on table attributes (i.e., rather than being a surrogate key), the primary key can be combined with the namespace identifier, $OID_D$, to generate a default URN.

Taking the example values 126 in the table 114, consider a table where $SID_D$ is {Attribute A, Attribute B}. When multiple attributes are in the $SID_D$, they can be separated by a delimiter, which in at least some cases can include ":". As described, the identifier 110, "XYZ" can be the $OID_D$. So, the URN for row 122a can be XYZ:A1:A2. In some cases, the syntax used for the URN can indicate which elements correspond to the $OID_D$, the $SID_D$, or the $SE_D$. As $OID_D$ is the first element, a terminal ":" can be sufficient to indicate the end of the $OID_D$. In the case of $SE_D$ with multiple attributes, a delimiter other than ":" can be used, such as "_" or "-". Similarly, attributes of the $SID_D$ can be separated by a different delimiter than used to separate different primary elements of the URN in order to help distinguish between such primary elements, and between subelements of primary elements.

Continuing the above example, assume that a database designer determines that Attribute D serves as semantically-enriching information. Although Attribute D is not necessary for distinguishing between rows 122 of the table 114, it can be included in the URN to make the URN more meaningful, such as to an end user, a developer, a database administrator, or to software programs or processes. When Attribute D is added as semantically enriching information, the URN for row 122a can be XYZ:D1:A1:B1 or XYZ:D1:A1-B1.

In a specific example, ":" (or another character) is used as a reserved separation character to separate the $OID_D$, $SE_D$, and $SID_D$ of a URN. In a particular implementation of this example, "-" (or another character) is used as a reserved separation character to separate subelements (e.g., field names or identifiers) within the $OID_D$, $SE_D$, and $SID_D$ of a URN. Having reserved separation characters can facilitate processing of URNs, include parsing the different elements and subelements of the URN, as well as other processing (e.g., removing other characters, including white spaces).

The schema for the table 114 can be restructured to include an attribute 118e for the URN. As the URNs in attribute 118e include at least some of the information from other attributes 118 of the corresponding row, the URN for any particular row contains semantically meaningful information. However, any particular row can be identified using only a single column—attribute 118e, which can make selects, joins, and other database operations more efficient. When the attribute 118e serves as the primary key, the primary key can be consistent between systems, as the URN includes meaningful information based on the properties of the entity, rather than a surrogate key, where it may be difficult to determine if two records having different surrogate keys represent the same entity, assuming that different surrogate key generation mechanisms were used for the two records.

The use of a semantically meaningful primary key, in the form of the URN (or, more generally, an $ID_D$) can also allow for additional database operations to be carried out that might not be possible using prior types of primary keys. For example, the URN attribute 118e can be searched for entries having particular elements, including semantic elements (e.g., elements of $SID_D$ or $SE_D$). Taking a table similar to the example table in Example 1, regarding car models, but using a disclosed URN, the URN could be searched to find entries for all "VW" models, "Green" cars, or all owner IDs having a particular set of characters (e.g., SELECT FROM TABLE WHERE URN LIKE 76%).

In some cases, elements of the $ID_D$ can be related, such as in a taxonomy. Taxonomies can include hierarchically related elements. When an $ID_D$ definition is being defined, a designer can include elements of the $ID_D$, such as elements of the $SE_D$ or the $SID_D$, in an order that assists a user in understanding what a particular record represents. In the case of hierarchically-related elements, the order may include listing elements in broad-narrow or narrow-broad order.

As an example, a three-level taxonomy may be used to describe asset types. One type of asset may be real property, which can have a label of "estate." Real property can have various sub-types, such as residential, commercial, industrial, undeveloped, or agricultural. Within one of those sub-types, additional classifications may exist, such as classifying residential properties as economy, premium, or super-premium. Thus, one way of expressing these properties, such as when used in the $SE_D$ for an object, could be broad-narrow, such as estate-residential-premium.

In some implementations, objects maintained in a data store can be versioned. In some cases, multiple versions of an object can be stored (either in the same table, or in different tables, for example). In other cases, only a latest version of an object is maintained. In any of these situations, it can be useful to associate a version code with the object.

The version code can be used in the $ID_D$, such as in the $SE_D$ or the $SID_D$. Including the version code in an $ID_D$ (e.g., as part of a URN), can be beneficial, as it can allow a one-column query to determine whether a specific version of the object exists in the data store, even if multiple versions of the object are maintained in the same database table.

Example 3

Example Method of Generating Data Identifiers for Specific Use Case

Figure 2:
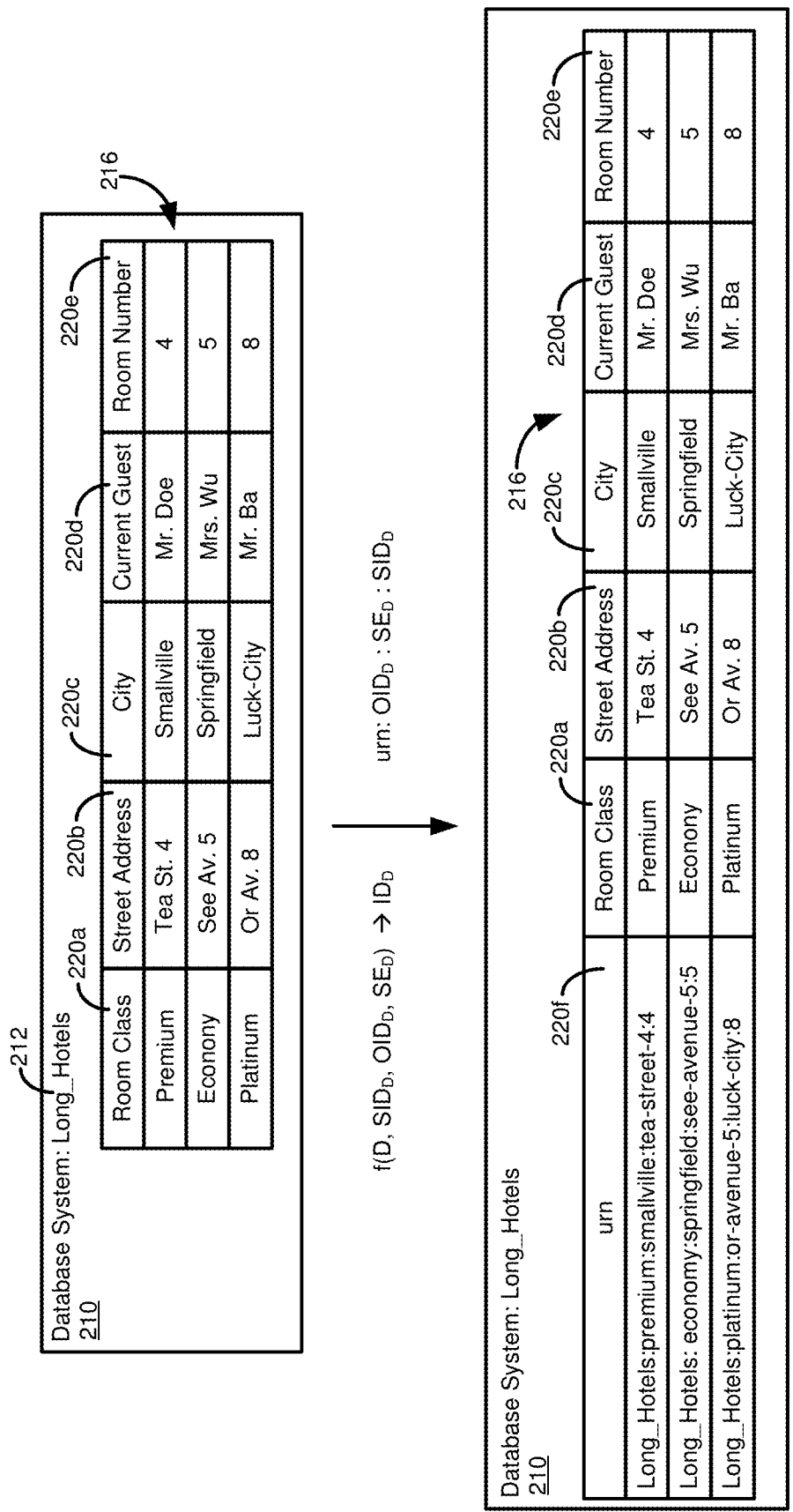
FIG. 2 is a diagram illustrating a specific database table, and how attributes of that table can be used to generate unique record identifiers.

FIG. 2 illustrates a more concrete example of how disclosed row identifiers can provide benefits in both understanding the context and meaning of a particular database record from its primary key value, and how such identifiers can result in improved database performance FIG. 2 illustrates a database system 210 associated with a particular namespace identified by identifier 212. In this example, the database system 210 can represent a database used by the entity "Long Hotels" (having a namespace identifier 212 of "Long_Hotels").

The database system 210 includes a table 216 the can be used to store information regarding guests that are registered with a hotel. The table 216 can include an attribute 220a representing a class of room associated with a particular hotel operated by Long Hotels (e.g., economy, premium, platinum), an attribute 220b representing the street address of the hotel, an attribute 220c representing the city or town in which the hotel is located, an attribute 220e representing a particular room number in a particular hotel, and an attribute 220d representing a current guest that is occupying that particular room.

At least in particular circumstances, none of the attributes 220 (e.g., 220a-220e) may be sufficient, by themselves, to serve as a primary key. For example, Long Hotels may have multiple premium hotels or multiple hotels located in a single city. A particular guest may have rented multiple rooms at a given property, and so guest name may not be sufficient to serve as a primary key. Similarly, although a street address might, by itself, be sufficient to identify a particular hotel, it still may not serve as a primary key, given that each hotel at a particular address has multiple rooms, and likely multiple guests. Thus, it is likely that a primary key constructed from the attributes 220 will require multiple, and perhaps all, of the attributes 220a-220e. Directly selecting records from the table 216, without the use of an index, can thus be computationally expensive, since it may require accessing every column of the table.

Continuing the example, assume that unique records in the table 116 can be identified using the street address 220b, city 220c, and room number 220e attributes. Assume further that is has been determined, such as by a database designer, that the room class attribute 220a should be included in the URN as semantically enriching information. Using the URN formulation from Example 2, the schema for the table 216 can be updated to add an attribute 220f for the URN.

Looking at the URN values of the attribute 220f, it can be seen how these record identifiers can immediately provide semantically meaningful information. The $SID_D$ information provides the address, city, and room number of a particular record. This information might be used to indicate that, for example, a problem exists with data being transferred from a particular hotel location. The semantic information, $SE_D$, regarding a room class provides additional information. The room class information may indicate, for instance, that a point of sale system associated with a particular hotel classification may be the source of database errors, or may indicate a particular priority for resolving any database issues (e.g., issues for platinum class hotels may be considered more urgent than issues for economy class hotels).

Example 4

Example Data Identifiers Used with Denormalized Database Tables

Figure 3:
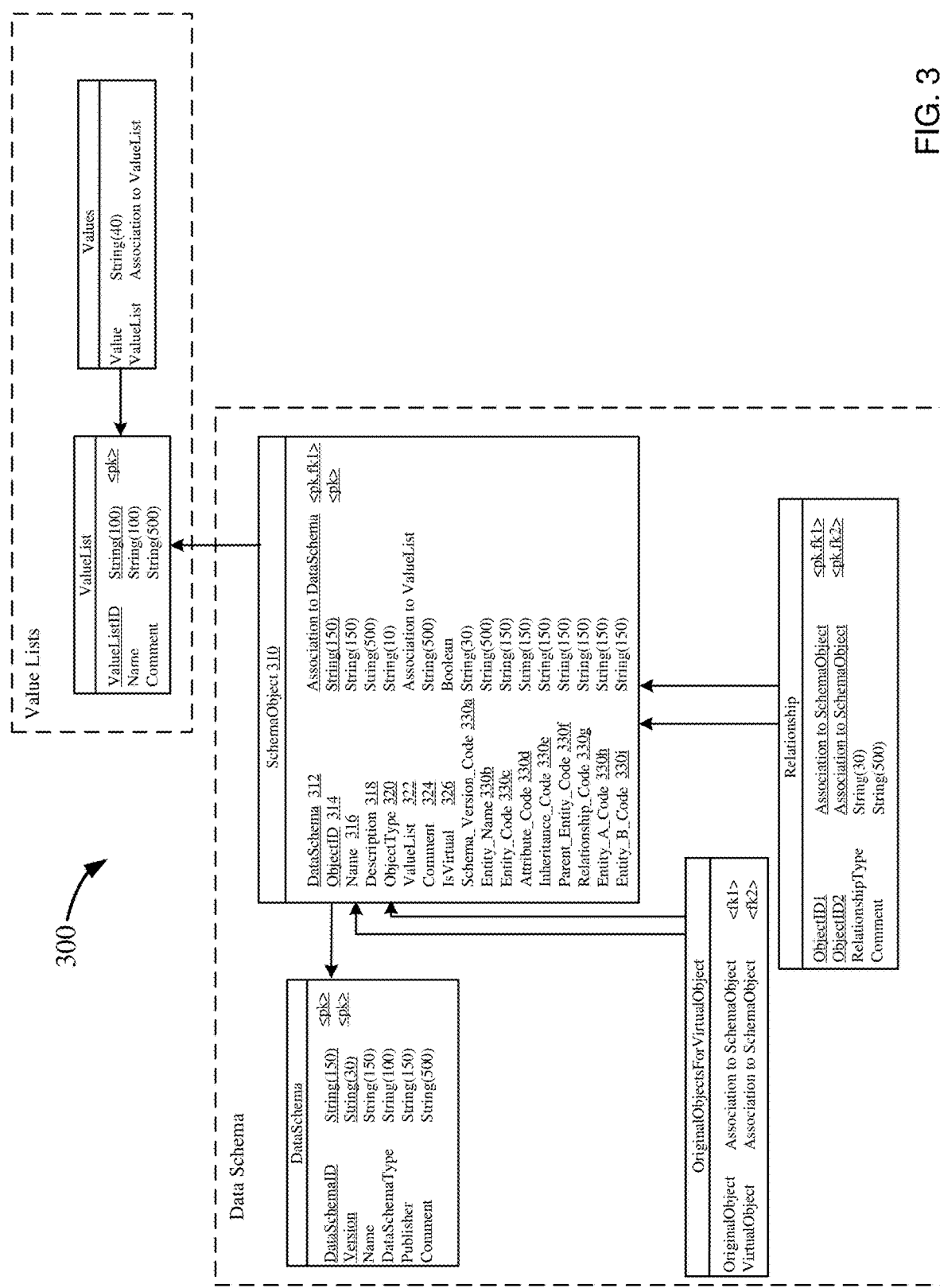
FIG. 3 is an example data model, illustrating how disclosed data identifiers can be used in conjunction with denormalized database tables.

As discussed in Example 1, traditional methods of identifying rows can be particularly problematic when denormalized tables are used, because different types of entities may be included in the same table. U.S. patent application Ser. No. 16/399,533, entitled "Matching Metastructure for Data Modeling," filed on Apr. 30, 2019, and incorporated by reference herein, describes innovations for matching different metadata schemas. FIG. 3 illustrates a portion of a data model 300 used in that application.

The data model 300 includes a SchemaObject table 310 that includes an attribute 312 identifying a particular schema associated with a mapping, an attribute 314 for an object ID of an object being mapped, an attribute 316 providing a name for the object, an attribute 318 providing a description for the object, an attribute 320 providing an object type for the object, an attribute 322 for any value list associated with the object (e.g., a list that specifies valid values the object may have), an attribute 324 representing comments provided for the object, and an attribute 326 indicating whether the object is a virtual object. The object type attribute 320 may have a number of possible values, such as indicating a database table, an attribute of a database table, an interface parameter, a relationship between tables (e.g., a relationship that might be indicated in an entity-relation diagram), calculation views, and attributes of calculation views.

As shown in FIG. 3, the SchemaObject table 310 can include the DataSchema attribute 312 and the ObjectID attribute 314 as elements of a composite primary key. However, using this value as a primary key can potentially reduce database performance, in some aspects, as multiple columns may need to be accessed in order to identify and retrieve data from a particular record. In addition, even though the primary key is constructed from attributes of the table 310, those attributes may not provide sufficient semantic information. For example, both the DataSchema attribute 312 and the ObjectID attribute 314 may be essentially artificial identifiers (e.g., alphanumeric values that can be randomly generated or otherwise do not convey significant semantic information, such as to a user).

The attributes 312-326 can be attributes that are meaningful for any entity type that may be included in the table 310. As the table 310 can contain a variety of entity types (e.g., object types indicated by attribute 320), it may include one or more attributes 330 (330a-330i) that are specific to one or more entity types associated with the table 310, but less than all of such entity types. Attributes 330 for entity types that are not relevant for an entity type for a given record can be left empty (i.e., no value is assigned to that cell of the table), or can be provided with NULL values or similar indicators that a value is not present, not relevant, or not defined for that record.

It should be appreciated that various changes can be made to the table 310. For instance, one or more of the general attributes 312-326 can be omitted, including being replaced with entity-specific attributes that serve a corresponding purpose. As an example, instead of a name attribute 316, the table 310 can include attributes 330 for names correlated with a specific object type (e.g., table name, attribute name, relationship name, etc.).

According to disclosed embodiments, multiple, different URN definitions can be provided for a single table. Typically, such URNs are defined such that any URN identifies a particular record in the table. Take, for example, table 310 as including an object entity type (e.g., tables) and a table attribute object type. A URN for a table object type can be created that uniquely identifies a particular record for a particular table, but also does not identify records corresponding to attributes or other object types.

FIG. 4 provides $ID_D$ definitions and example URNs for various object types that can be included in a table having the table schema 310. An example table 500 according to the table schema 310 is provided in FIG. 5. In the URNs of FIG. 4, the $OID_D$ is associated with a mapping tool, and the same value is used for all of the $ID_D$ definitions/URNS for the different object types. In the examples shown, the object type attribute 320 is used as the semantically enhancing information, $SE_D$. Thus, when a user views a URN constructed according to FIG. 4, the user will immediately be able to tell what type of object is being represented, which can make other components of the URN more meaningful to the user.

In FIG. 4, definition 410 is provided for an entity object type, where an entity may refer to a table in a relational database system. The $OID_D$ 412, is defined as a particular namespace. In this case, the $OID_D$ 412 includes the name of the company associated with the database system, "SAP," and a particular software component associated with all or a portion of the database, "Mapping_Tool." As described above, URNs for table 310 can include the entity type as semantically enriching information, the $SE_D$ 414. In this case, the object type is "entity."

The information used in an $SID_D$ 416 for the entity object type can include information useable to uniquely identify records in the table 310, including records having the entity object type and records having a different object type. The $SID_D$ 416 includes a schema_code attribute 312, a schema_version_code attribute 330a, and an entity code 330c.

In the table 500, row 508 corresponds to a record for an entity object type. In row 508, attributes used in the $SE_D$ and the $SID_D$, attributes 320 and 312, 330a, 330c are shown as populated, as are some of the general attributes, attributes 314, 316, 318, 326. Other general attributes, and attributes 330 (including those associated with $SID_D$ information for other object types) are shown as having NULL values. In other cases, some or all of such attributes can be populated, or can lack a value rather than being assigned a null value. Using the example $OID_D$ information provided above, and the information of row 508, an $ID_D$/URN 418 can be generated as:

urn: sap-mapping_tool:entity:fsdm-v2-loan

In FIG. 4, a definition 420 is provided for an attribute object type (e.g., a column definition that can be associated with a particular table, or which can be used in a plurality of tables). An $OID_D$ 422 is defined as for the $OID_D$ 412 for the entity object type definition 410. Similarly, an $SE_D$ 424 is defined as for the $SE_D$ 414, as the object type 320, except that the value for the object type will be "attribute" rather than entity. An $SID_D$ 426 in the definition 420 can use attributes that are relevant to an attribute object type, and useable to identify a particular record for an attribute. The $SID_D$ 426 is shown as including the schema code attribute 312 and the schema version code attribute 330a, as in the definition 410. However, the $SID_D$ 426 includes the entity name attribute 330b and the attribute code attribute 330d, rather than including the entity code attribute 330c that is included in the $SID_D$ definition 416 for the URN specification 410 for an entity object type.

In the table 500, row 512 corresponds to a record for an attribute object type. In row 512, attributes used in the $SE_D$ and $SID_D$, attributes 320 and 312, 330a, 330b, 330d are shown as populated, as are some of the general attributes, attributes 314, 316, 318, 326. Other general attributes, and attributes 330 (including those associated with $SID_D$ information for other object types) are shown as having NULL values. In other cases, some or all of such attributes can be populated, or can lack a value rather than being assigned a null value. Using the example $OID_D$ information provided above, and the information of row 512, an $ID_D$/URN 428 can be generated as:

urn: sap-mapping_tool:attribute:fsdm-v2-loan-currency

In FIG. 4, a definition 430 is provided for an inheritance object type (e.g., an object that defines a relationship between a parent object and a child object, where the child object includes some or all of the properties of the parent object, where the parent object and child object can be, in particular examples, table schemas). An $OID_D$ 432 is defined as for the $OID_D$ 412 for the entity object type definition 410. Similarly, an $SE_D$ 434 is defined as for the $SE_D$ 414, as the object type, except that the value for the object type will be "inheritance" rather than entity. A $SID_D$ 436 in the definition 430 can use attributes that are relevant to an inheritance object type, and useable to identify a particular record for a particular inheritance object. The $SID_D$ 436 is shown as including the schema code attribute 312 and the schema version code attribute 330a, as in the definition 410. However, the $SID_D$ 436 includes the inheritance_code attribute 330e and the parent_entity_code attribute 330f, rather than including the entity code attribute 330c that is included in the $SID_D$ definition 416 for the URN specification 410 for an entity object type.

In the table 500, row 516 corresponds to a record for an attribute object type. In row 516, attributes used in the $SE_D$ and $SID_D$, attributes 320 and 312, 330a, 330e, 330f are shown as populated, as are some of the general attributes, attributes 314, 316, 318, 326. Other general attributes, and attributes 330 (including those associated with $SID_D$ information for other object types) are shown as having NULL values. In other cases, some or all of such attributes can be populated, or can lack a value rather than being assigned a null value. Using the example $OID_D$ information provided above, and the information of row 516, an $ID_D$/URN 438 can be generated as:

urn: sap-mapping_tool:inheritance:fsdm-v2-retail_loan-loan

In FIG. 4, a definition 440 is provided for a relationship object type (e.g., an object that defines a relationship between two other schema objects, such as between two entities or between two attributes). An $OID_D$ 442 is defined as for the $OID_D$ 412 for the entity object type definition 410. Similarly, an $SE_D$ 444 is defined as for the $SE_D$ 414, as the object type, except that the value for the object type will be "relationship" rather than entity.

An $SID_D$ 446 in the definition 440 can use attributes that are relevant to a relationship object type, and useable to identify a particular record for a particular relationship object. The $SID_D$ 446 is shown as including the schema code attribute 312a and the schema version code attribute 330a, as in the definition 410. However, the SID$_D$ 446 includes the relationship_code attribute 330g, the entity_A_code attribute 330h, and the entity_B_code attribute 330i, rather than including the entity code attribute 330c that is included in the SID$_D$ definition 416 for the URN specification 410 for an entity object type.

In the table 500, row 520 corresponds to a record for a relationship object type. In row 520, attributes used in the SE$_D$ and SID$_D$, attributes 320 and 312, 330a, 330g, 330h, 330i, 330j are shown as populated, as are some of the general attributes, attributes 314, 316, 318, 326. Other general attributes, and attributes 330 (including those associated with SID$_D$ information for other object types) are shown as having NULL values. In other cases, some or all of such attributes can be populated, or can lack a value rather than being assigned a NULL value. Using the example OID$_D$ information provided above, and the information of row 520, an ID$_D$/URN 448 can be generated as:

urn: sap-mapping_tool:relationship:fsdm-v2-loan_customer-loan-customer

Example 5

Example Data Retrieval Using Disclosed Data Identifiers

Figure 6:
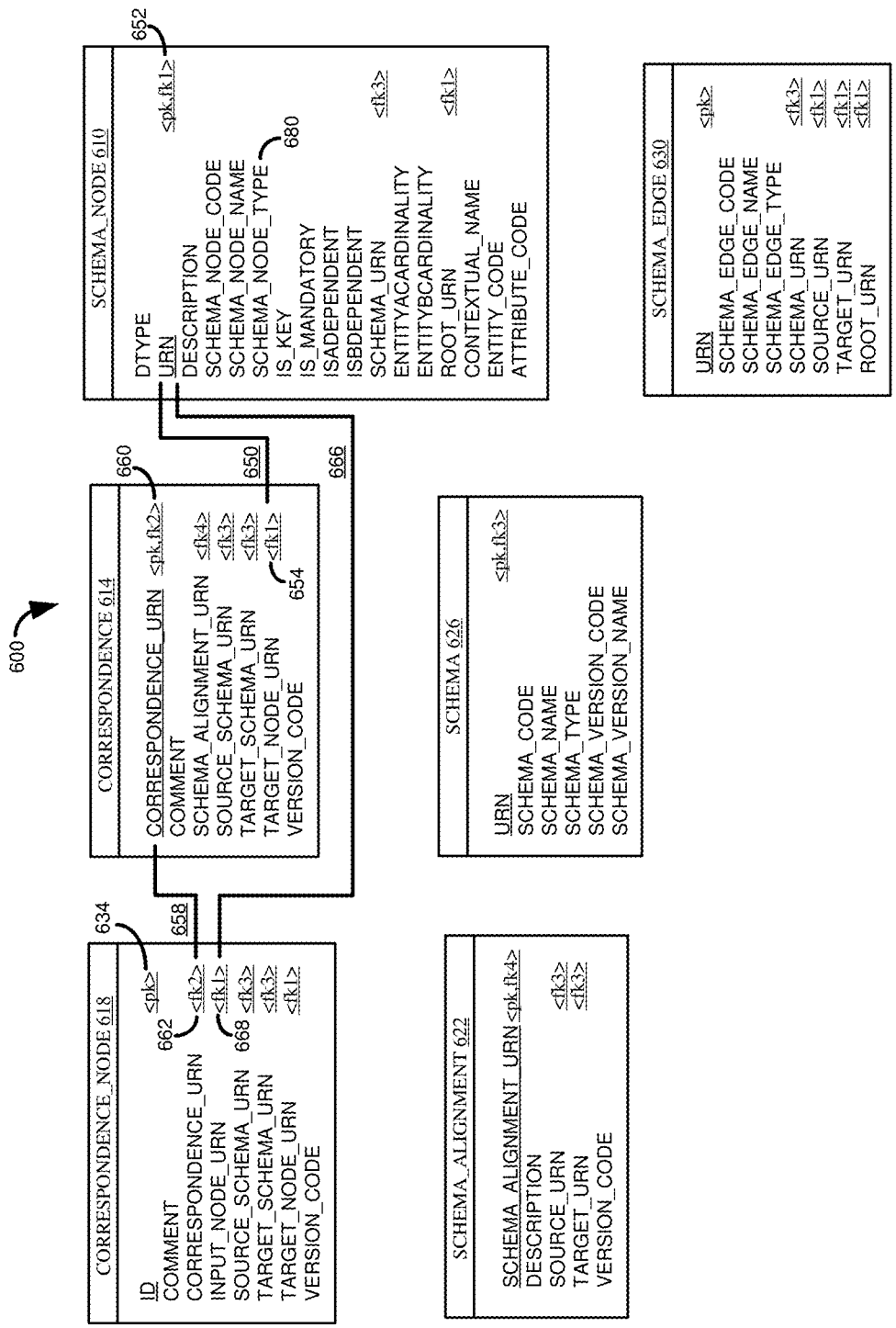
FIG. 6 is an example data model, illustrating how disclosed data identifiers can be useful in relating database tables, including for purposes of database operations, such as JOINs.

FIG. 6 illustrates a data model 600 that can have components that are at least generally similar to components of the data model 300 of FIG. 3. In FIG. 6, a SCHEMA_NODE table 610 can be at least generally similar to the SchemaObject table 310 of FIG. 3. The table 610 can store information regarding objects of multiple object types in a database schema, where the object types can include, for example, attributes, tables (entities), relationships, inheritances, etc.

A CORRESPONDENCE table 614 can store information regarding objects in a target database schema (e.g., to which a source database schema is being mapped). A CORRESPONDENCE_NODE table 618 can store information that, for a particular set of schemas, maps an object from the source schema to an object in the target schema. A SCHEMA_ALIGNMENT table 622 can represent a particular mapping between a source schema and a target schema, where an individual schema can be represented in a SCHEMA table 626. A SCHEMA_EDGE table 630 can store relationships between objects within the same schema (e.g., attributes that are associated with a particular table).

Some or all of the tables 610-630 can include primary keys in the form of URNs, such URNs constructed as, or constructed in a similar manner to, those described in Examples 2-4. However, not all tables in a database system, or a particular schema, need to include keys formed in accordance with the present disclosure. For example, the table 618 includes a primary key 634 that can be a surrogate key, such as a randomly generated number. Although not shown in the schema 600, tables can also include primary keys that are a single table attribute or composite keys formed from a plurality of table attributes (but, typically do not include a separate column that stores the composite key value).

FIG. 7 presents example SQL code 700 that can be used to display object mappings between two schemas. The SQL code includes a three way join. The joins are shown in FIG. 6. Join 650 joins the CORRESPONDENCE table 614 with the SCHEMA_NODE table 610 using the URN of a target node, where such URN is the primary key 652 of the table 610, and is a foreign key 654 of the table 614. Join 658 joins the CORRESPONDENCE table 614 with the CORRESPONDENCE_NODE table 618 using the correspondence URN 660, which serves as the primary key for the table 614, and as a foreign key 662 for the table 618. Join 666 joins the CORRESPONDECE_NODE table 618 with the SCHEMA_NODE table 610 using the URN 652, the primary key of the table 610, which serves as a foreign key 668 of the table 618.

FIG. 8 presents an example user interface screen 800 showing example query execution results of executing the SQL code 700.

Although the SQL code 700 includes a three-way join, it can execute significantly more quickly than in cases where composite primary keys are used. Each of the joins 650, 658, 666 is on a single column. However, the primary keys 652, 660 provide meaningful information to users, including, for the primary key 652, the type of object represented by the record, provided by the SCHEMA_NODE_TYPE attribute 680. In addition to executing more quickly than if composite keys were used, the SQL code 700 can be simpler to write, and to understand, which can help in programming and debugging efforts.

Example 6

Example Duplicate Data Object Detection Using Disclosed Data Identifiers

Figure 9:
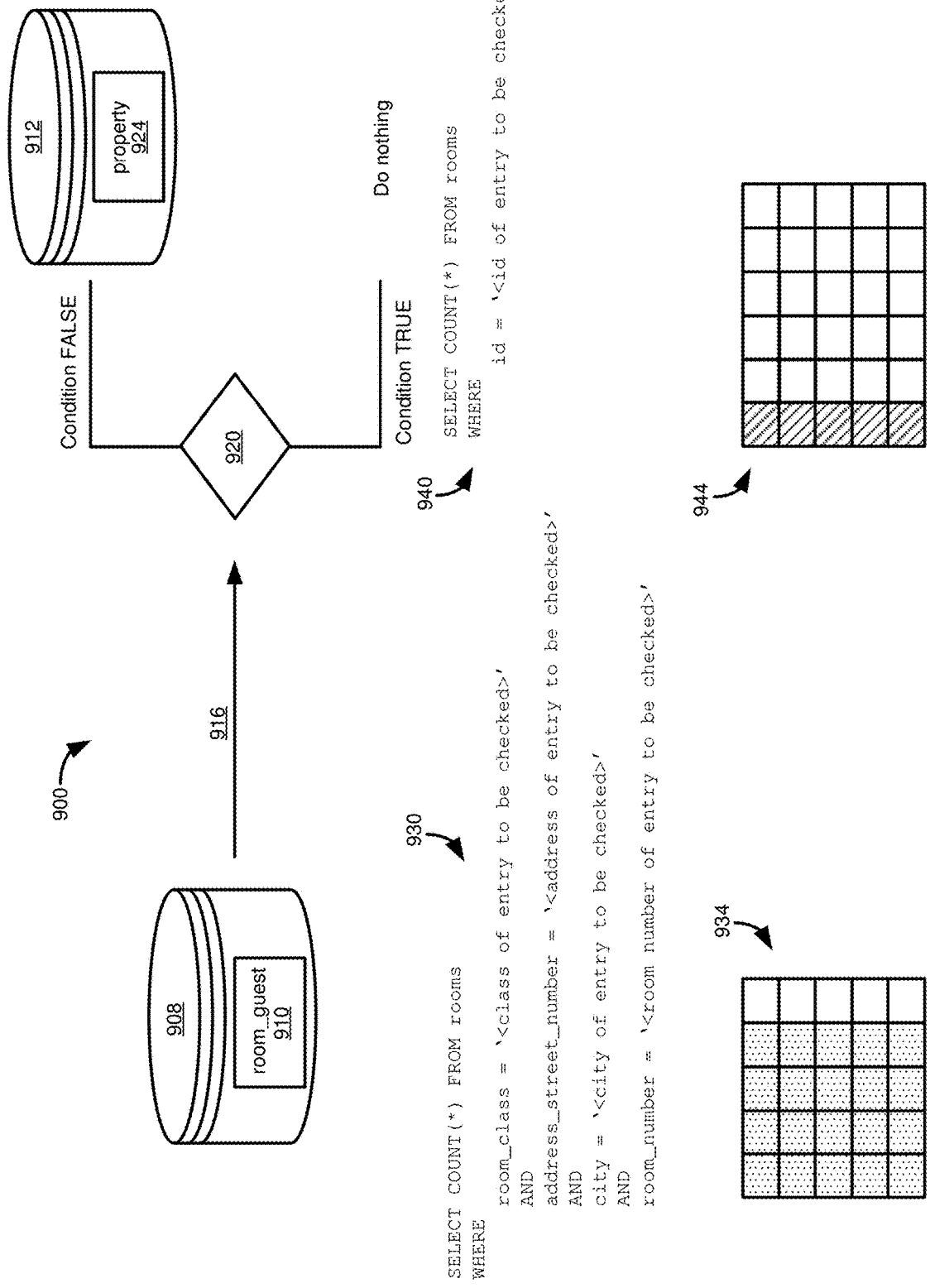
FIG. 9 is a diagram illustrating how disclosed data identifiers can simplify data retrieval operations, such as operations to determine whether a particular object exists in a database table.

As has been disclosed, disclosed innovations can provide enhanced database performance, including allowing queries and other operations to execute more quickly, and using fewer computing resources, such as memory and processor time. Database systems can also be more accurate, including because duplicate entries are less likely to occur, as they can be more easily detected. FIG. 9 illustrates a scenario 900 where data from a transactional database system 908, such as associated with Long Hotels, described in Example 3, is transferred (such as from a room_guest table 910) to an analytical database system 912 in an extract-transform-load (ETL) process 916.

As data is imported to the analytical database system 912 during the ETL process 916, decision 920 determines whether a record being imported already exists in a target table 924 (a property table) of the analytical database system. If the record exists, it is not imported. If the record does not exist, it is imported.

SQL statement 930 represents a query that can be used to determine whether a particular record already exists in the target table 924, when a primary key was constructed according to prior approaches. In this case, a primary key may correspond to attributes for a room class, an address, a city, and a room number. As shown in schematic table representation 934, the primary key requires four out of five columns of the table 216 (upper version) of FIG. 2.

SQL statement 940 represents a query that can be used to determine whether a particular record exists in the target table 924 when the primary key is a URN constructed described in Examples 2-4. As shown in the table schematic 944, the table with the URN as the primary key includes an extra column, as compared with the table representation 934 with the composite key, to hold the URN. However, the entity check can be reduced to a check of the URN of the data being extracted from the transactional database system 908 against data in the target table 924—which only requires accessing the URN column of the table representation 944.

In this example, use of the disclosed record identifiers reduces column selection by 75%.

Generally, the use of composite keys scales multi-linearly with the number of attributes N in a key and the number of entries in a table M. Using big O notation, the time complexity can be described as O(N*M). In contrast, when using the disclosed data identifiers, because only a single column is needed to access an entry, the time complexity for locating a record scales linearly with the number of records, having O(M).

Example 7

Example Data Transformation Operations

Figure 10:
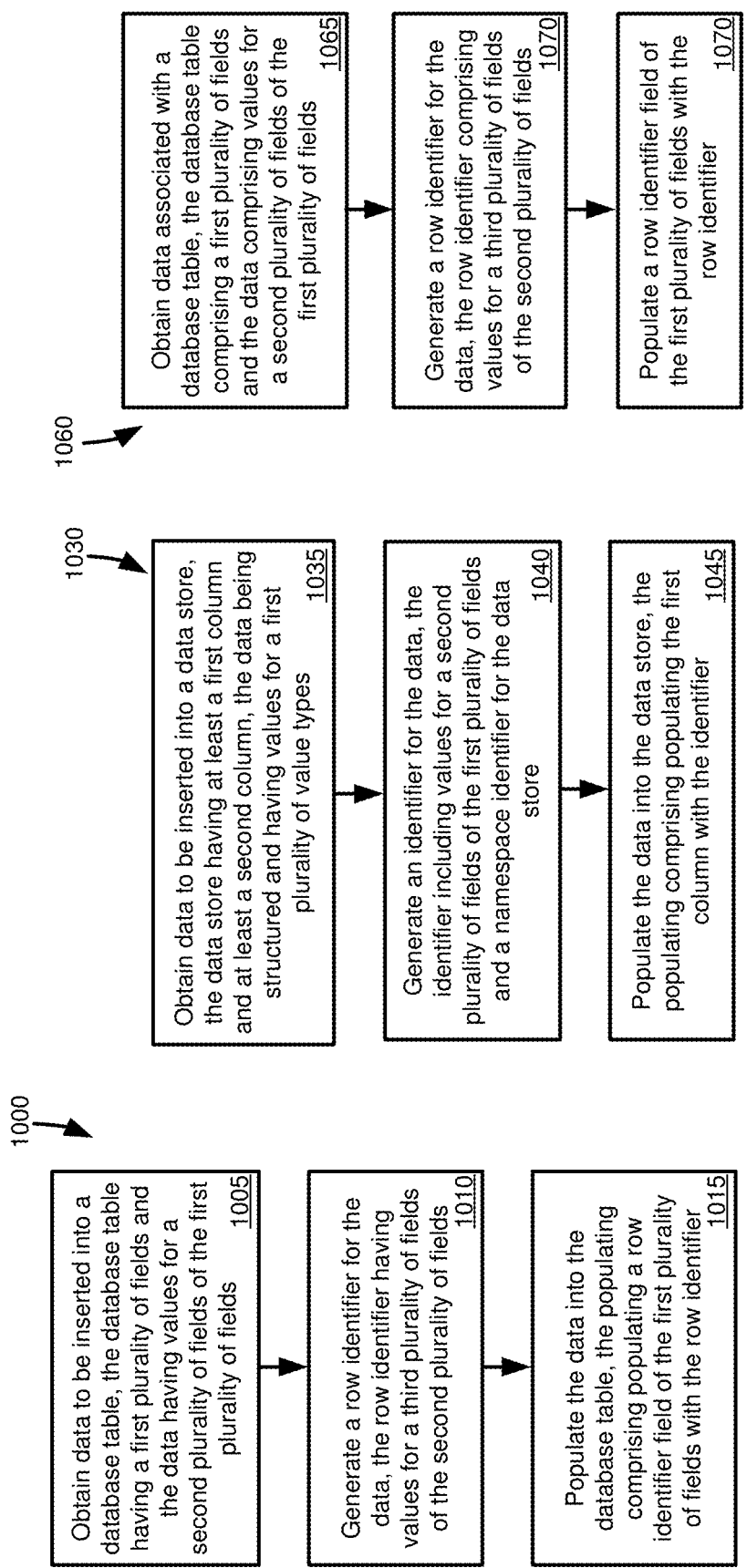
FIGS. 10A-10C are flowcharts illustrating operations in disclosed embodiments of generating data identifiers.

FIG. 10A is a flowchart of an example method 1000 of generating a row identifier for data to be inserted into a database table, such as a relational database table or a table in the form of a key-value store. At 1005, data is obtained that is to be inserted into a database table. The database table includes a first plurality of fields (e.g., attributes). The data to be inserted has values for a second plurality of fields of the first plurality of fields. In some cases, the second plurality of fields can be the same as the first plurality of fields.

A row identifier is generated for the data at 1010. The row identifier has values from a third plurality of fields of the second plurality of fields. In some cases, the third plurality of fields can be the same as the second plurality of fields.

At 1015, the data is populated into the database table. The populating includes populating a row identifier field of the first plurality of fields with the row identifier.

FIG. 10B is a flowchart of a method 1030 for generating an identifier for data to be stored in a data store, such as a database system (e.g., a relational database system) or a key-value store. At 1035, data is obtained to be inserted into a data store. The data store has at least a first column (which can be, for example, a key column of a key-value store) and at least a second column (which can be, for example, a value column of a key-value store). The data is structured, and has values for a first plurality of value types. For example, the data can be an instance of an abstract or composite data type, where the data values correspond to data members, and the instance has values for at least some of the data members.

An identifier for the data is generated at 1040. The identifier includes values for a second plurality of fields of the first plurality of fields. The identifier also includes a namespace identifier for the data store (such as an identifier of a database system or a schema of the database system).

At 1045, the data is populated to the data store. The populating includes populating the first column of the data store with the generated identifier.

FIG. 10C is a flowchart of a method 1060 for generating a row identifier for data associated with a database table, such as data stored in the database table, data to be inserted into the database table, or data to be compared with data in the database table. At 1065, data associated with the database table is obtained. The database table includes a first plurality of fields (e.g., columns or attributes). The data includes values for a second plurality of fields of the first plurality of fields. In some cases, the second plurality of fields can be the same as the first plurality of fields.

A row identifier for the data is generated at 1070. The row identifier includes values for a third plurality of fields of the second plurality of fields. In some cases, the third plurality of fields can be the same as the second plurality of fields.

At 1075, a row identifier field of the first plurality of fields is populated with the row identifier.

Example 8

Computing Systems

Figure 11:
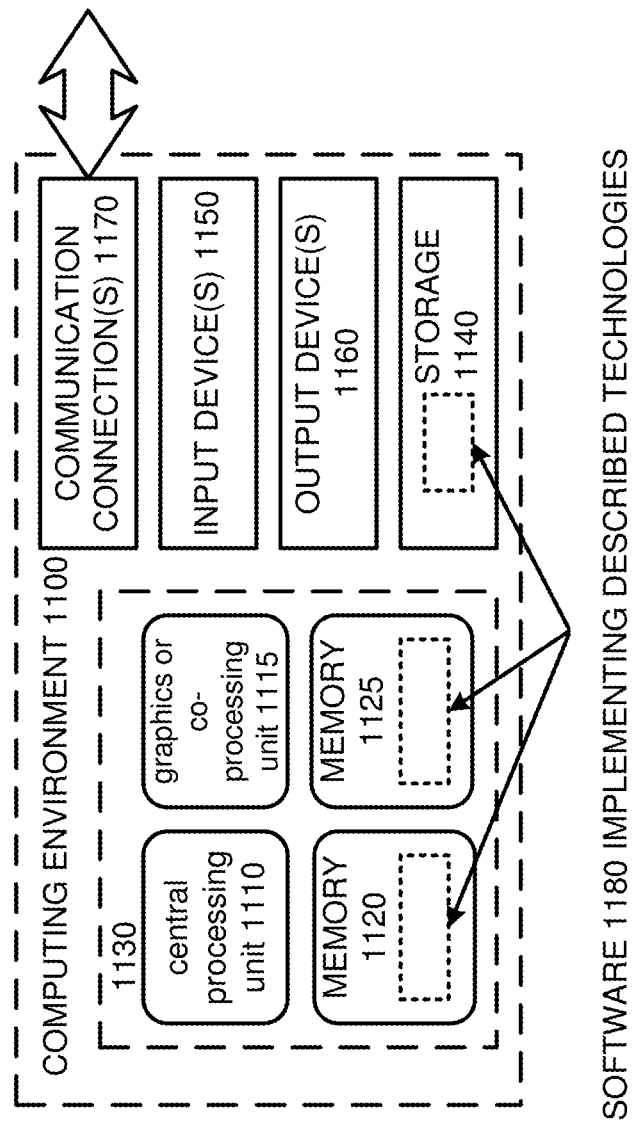
FIG. 11 is a diagram of an example computing system in which some described embodiments can be implemented.

FIG. 11 depicts a generalized example of a suitable computing system 1100 in which the described innovations may be implemented. The computing system 1100 is not intended to suggest any limitation as to scope of use or functionality of the present disclosure, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions, such as for implementing technologies described in Examples 1-7. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 stores software 1180 implementing one or more innovations described herein, in the form of computer-executable instructions suitable for execution by the processing unit(s) 1110, 1115.

A computing system 1100 may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way, and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 9

Cloud Computing Environment

Figure 12:
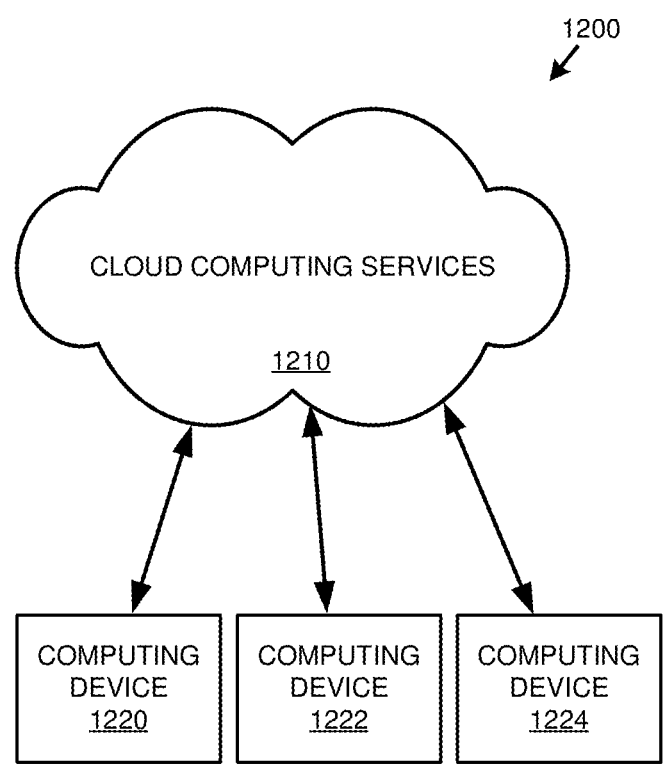
FIG. 12 is an example cloud computing environment that can be used in conjunction with the technologies described herein.

FIG. 12 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operators (e.g., data processing, data storage, and the like).

Example 10

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 11, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, R, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
    obtaining data to be inserted into a database table, the database table comprising a first plurality of fields and the data comprising values for a second plurality of fields of the first plurality of fields;
    generating a plurality of row identifiers for the data, wherein a given row identifier of the plurality of row identifiers uniquely identifies a row of the database table and comprises a plurality of values from a third plurality of fields of the second plurality of fields;
    populating the data into the database table, the populating comprising populating a row identifier field of the first plurality of fields with the row identifiers; and
    (1) receiving a query comprising one or more search terms and identifying at least one table row of the table by comparing at least one of the one or more search terms with the row identifier for the at least one table row; or
    (2) retrieving at least one row identifier of the plurality of row identifiers from the table and displaying the row identifier to a user.

2. The method of claim 1, wherein the database table is in a database schema of a database system, the database system being associated with a namespace identifier, wherein the row identifier comprises the namespace identifier.

3. The method of claim 1, wherein a fourth plurality of fields of the third plurality of fields are useable to uniquely identify a row having the row identifier from a plurality of rows of the database table.

4. The method of claim 3, wherein fields of the fourth plurality of fields are separated by a delimiter.

5. The method of claim 3, wherein at least one of the third plurality of fields in the row identifier is not needed to uniquely identify the row.

6. The method of claim 5, wherein the at least one of the third plurality of fields is separated from fields of the fourth plurality of fields by a syntax element.

7. The method of claim 5, wherein the at least one of the third plurality of fields comprises semantically enriching information.

8. The method of claim 3, wherein a fifth plurality of fields of the third plurality of fields are not needed to uniquely identify the row.

9. The method of claim 8, wherein the fifth plurality of fields are hierarchically arranged in the row identifier.

10. The method of claim 8, wherein fields of the fifth plurality of fields are separated by a delimiter.

11. The method of claim 1, wherein the row identifier is a first row identifier, the method further comprising:
    receiving request to retrieve data from the database table, the request comprising a second row identifier;
    searching the database table for a row having the second row identifier;
    determining that the first row identifier matches the second row identifier; and
    retrieving at least a portion of data associated with a row having the first row identifier.

12. The method of claim 11, wherein the request comprises a SELECT operation.

13. The method of claim 11, wherein the request comprises a JOIN operation.

14. The method of claim 1, wherein the row identifier is a first row identifier, the method further comprising:
    receiving request to add a row to the database table, the request comprising a second row identifier;
    searching the database table for a row having the second row identifier;
    determining that the first row identifier matches the second row identifier; and
    based on the determining, not adding the row to the database table.

15. The method of claim 1, wherein the row identifier is a first row identifier, the method further comprising:
    receiving request to add a row to the database table, the request comprising a second row identifier;
    searching the database table for a row having the second row identifier;
    determining that no row identifiers in the database table match the second row identifier; and
    based on the determining, adding the row to the database table.

16. The method of claim 1, wherein the database table is a denormalized database table that comprises rows representing a plurality of object types.

17. The method of claim 16, wherein a field of the third plurality of fields represents the object type.

18. The method of claim 1, wherein the database table is a first database table and is part of a database system comprising at least a second database table, the second database table comprises a plurality of attributes, at least one of the plurality of attributes being a foreign key referencing the row identifier field of the first database table.

19. A computing system comprising:
    memory;
    one or more processing units coupled to the memory; and
    one or more computer readable storage media storing instructions that, when executed, cause the computing system to perform operations comprising:
        obtaining data to be inserted into a data store, the data store comprising at least a first column and at least a second column, the data being structured and having values for a first plurality of value types;

generating an identifier for the data, the identifier comprising at least one value of the values for a first plurality of value types and a namespace identifier for the data store, wherein the identifier uniquely identifies the data;

populating the data into the data store, the populating comprising populating the first column with the identifier; and (1) receiving a query comprising one or more search terms and identifying the data by comparing at least one of the one or more search terms with identifier; or (2) retrieving the identifier and displaying the identifier to a user.

20. One or more computer-readable medium comprising:

computer-executable instructions that, when executed by a computing system comprising at least one memory and at least one hardware processor coupled to the at least one memory, cause the computing system to obtain data associated with a database table, the database table comprising a first plurality of fields and the data comprising values for a second plurality of fields of the first plurality of fields;

computer-executable instructions that, when executed by the computing system, cause the computing system to generate a row identifier for the data, the row identifier comprising a plurality of values for a third plurality of fields of the second plurality of fields;

computer-executable instructions that, when executed by the computing system, cause the computing system to populate a row identifier field of the first plurality of fields with the row identifiers and:

(1) computer-executable instructions that, when executed by the computing system, cause the computing system to receive a query comprising one or more search terms and identifying at least one table row of the database table by comparing at least one of the one or more search terms with the row identifier for the at least one table row; or (2) computer-executable instructions that, when executed by the computing system, cause the computing system to retrieve at least one row identifier from the database table and displaying the row identifier to a user.

* * * * *